United States Patent
Yan

(10) Patent No.: US 10,320,040 B2
(45) Date of Patent: Jun. 11, 2019

(54) COOLING SYSTEM HAVING A COOLANT-CONDUCTING HEAT SINK FOR COOLING A BATTERY

(71) Applicants: Robert Bosch GmbH, Stuttgart (DE); Samsung SDI Co., Ltd., Yongin-si, Gyeonggi-do (KR)

(72) Inventor: Xiaofeng Yan, Weinstadt (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 460 days.

(21) Appl. No.: 14/150,044

(22) Filed: Jan. 8, 2014

(65) Prior Publication Data
US 2014/0202671 A1 Jul. 24, 2014

(30) Foreign Application Priority Data
Jan. 18, 2013 (DE) .................. 10 2013 200 790

(51) Int. Cl.
*B60L 3/00* (2019.01)
*H01M 10/613* (2014.01)
(Continued)

(52) U.S. Cl.
CPC ......... *H01M 10/625* (2015.04); *B60L 3/0046* (2013.01); *B60L 11/1874* (2013.01);
(Continued)

(58) Field of Classification Search
CPC .. H01M 10/5004; H01M 10/60; H01M 10/61; H01M 10/613; H01M 10/625;
(Continued)

(56) References Cited

U.S. PATENT DOCUMENTS 2,753,954 A * 7/1956 Townsend .............. F04B 39/16
165/11.1
3,110,633 A 11/1963 Bachmann
(Continued)

FOREIGN PATENT DOCUMENTS

DE 1 968 891 U 9/1967
DE 39 30 530 A1 3/1991
(Continued)

OTHER PUBLICATIONS http://www.professionalplastics.com/professionalplastics/PDFullLineBrochure-4-16-2009.pdf, Apr. 16, 2009 p. 11.*
(Continued)

*Primary Examiner* — Keith M Raymond
*Assistant Examiner* — Gustavo A Hincapie Serna
(74) *Attorney, Agent, or Firm* — Maginot, Moore & Beck LLP

(57) ABSTRACT

A cooling system includes at least one coolant-conducting heat sink configured to cool a battery. The cooling system also includes further coolant-conducting components including at least one conduit configured to feed coolant to the at least one heat sink and at least one conduit configured to carry coolant away from the at least one heat sink. At least some of the further coolant-conducting components are at least partially surrounded by at least one sheathing element, such that a closed volume space is formed between the at least one sheathing element and the at least some of the further coolant-conducting components.

7 Claims, 2 Drawing Sheets

(51) Int. Cl.
*H01M 10/625* (2014.01)
*H01M 10/658* (2014.01)
*H01M 10/6556* (2014.01)
*H01M 10/6568* (2014.01)
*B60L 11/18* (2006.01)

(52) U.S. Cl.
CPC ....... *H01M 10/613* (2015.04); *H01M 10/658* (2015.04); *H01M 10/6556* (2015.04); *H01M 10/6568* (2015.04); *Y02T 10/7005* (2013.01); *Y02T 10/705* (2013.01)

(58) Field of Classification Search
CPC ............. H01M 10/65; H01M 10/6556; H01M 10/6568; H01M 10/658; F25D 23/12; F28F 7/00; D06F 39/081; F24H 9/165; F16L 55/11; B60L 3/0046; B60L 11/187; B60L 11/1874; Y02T 10/7005; Y02T 10/705
USPC .............. 165/70, 804, 168; 137/312; 138/89
See application file for complete search history.

(56) References Cited

U.S. PATENT DOCUMENTS

| | | | | |
|---|---|---|---|---|
| 4,316,501 A * | 2/1982 | Bowden | ................ | F28F 1/003 165/163 |
| 4,615,359 A * | 10/1986 | Affa | ........................ | F16L 59/07 138/104 |
| 5,361,603 A * | 11/1994 | Merritt-Munson | ........................ | A45C 11/008 220/592.25 |
| 5,495,873 A * | 3/1996 | Butkiewicz | ............ | F01N 13/141 138/114 |
| 5,611,392 A | 3/1997 | Malecek et al. | | |
| 6,031,751 A * | 2/2000 | Janko | ........................ | F28F 13/00 165/104.33 |
| 6,065,740 A * | 5/2000 | Morton | ........................ | F24F 6/18 239/139 |
| 6,145,545 A * | 11/2000 | Hartnagel | ........... | B60H 1/00342 138/109 |
| 6,199,595 B1 * | 3/2001 | Baker | ........................ | F16L 1/24 138/115 |
| 6,305,407 B1 * | 10/2001 | Selby | ........................ | F16L 35/00 137/312 |
| 6,360,559 B1 * | 3/2002 | Midorikawa | ........ | H05K 7/20272 165/104.33 |
| 6,445,568 B1 * | 9/2002 | Baur | ........................ | B60R 16/0239 174/50 |
| 6,565,126 B1 * | 5/2003 | Julien | ........................ | B25J 19/0025 285/122.1 |
| 6,575,258 B1 * | 6/2003 | Clemmer | ................ | B60K 11/02 165/41 |
| 7,063,133 B2 * | 6/2006 | Gordon | ................ | F24D 3/082 165/154 |
| 7,642,003 B2 * | 1/2010 | Ahn | .................... | H01M 2/1016 165/80.1 |
| 7,770,602 B2 * | 8/2010 | Buschhoff | ................ | F16L 9/18 138/108 |
| 9,166,207 B2 * | 10/2015 | Fujimura | ................ | H01M 2/02 |
| 9,722,216 B2 * | 8/2017 | Jansen | ................ | H01M 2/0245 |
| 2002/0189440 A1 * | 12/2002 | Giddens | ............. | F15B 15/1428 92/144 |
| 2003/0047366 A1 * | 3/2003 | Andrew | ................ | B60L 3/0046 180/68.5 |
| 2003/0213871 A1 * | 11/2003 | Howe | .................... | B64D 37/00 244/129.1 |
| 2004/0134553 A1 * | 7/2004 | Ichimura | ............ | B60H 1/00571 138/114 |
| 2005/0067579 A1 * | 3/2005 | Tsuchiya | ................ | G01T 1/2928 250/370.15 |
| 2008/0055821 A1 * | 3/2008 | Sasaki | ................ | H01R 13/5227 361/601 |
| 2009/0136831 A1 * | 5/2009 | Wyser | ..................... | H01M 2/02 429/94 |
| 2009/0301125 A1 * | 12/2009 | Myles | ................ | B60H 1/00271 62/323.1 |
| 2011/0020676 A1 * | 1/2011 | Kurosawa | ................ | B60K 1/04 429/62 |
| 2011/0120576 A1 * | 5/2011 | Sigouin | ..................... | F16L 9/19 137/551 |
| 2011/0206967 A1 * | 8/2011 | Itsuki | ........................ | B60K 1/04 429/120 |
| 2011/0318628 A1 * | 12/2011 | Heim | ................ | H01M 10/5004 429/120 |
| 2012/0107664 A1 * | 5/2012 | Lee | ..................... | H01M 2/1077 429/120 |
| 2012/0148889 A1 * | 6/2012 | Fuhr | ..................... | H01M 2/1077 429/87 |
| 2012/0231314 A1 * | 9/2012 | Sohn | .................... | H01M 2/1077 429/120 |
| 2013/0004822 A1 * | 1/2013 | Hashimoto | ......... | H01M 2/1072 429/120 |
| 2013/0029193 A1 * | 1/2013 | Dyer | ..................... | H01M 10/486 429/62 |
| 2014/0342195 A1 * | 11/2014 | Bhola | ..................... | H01M 10/625 429/50 |

FOREIGN PATENT DOCUMENTS

| | | | |
|---|---|---|---|
| DE | 691 31 054 T2 | 10/1999 | |
| DE | 10218539 A1 | 11/2002 | |
| DE | 11 2006 000 552 T5 | 3/2008 | |
| DE | 10 2008 059 969 A1 | 6/2010 | |
| DE | 10 2008 062 158 A1 | 6/2010 | |
| JP | 2002164070 | * 6/2002 | ............. H01M 8/04 |
| JP | 2002164070 A | * 6/2002 | ............. H01M 8/04 |

OTHER PUBLICATIONS

Machine Translation JP 2002164070 A.*
Professional Plastics, inc. PEEK film Brochure Apr. 16, 2009.*

* cited by examiner

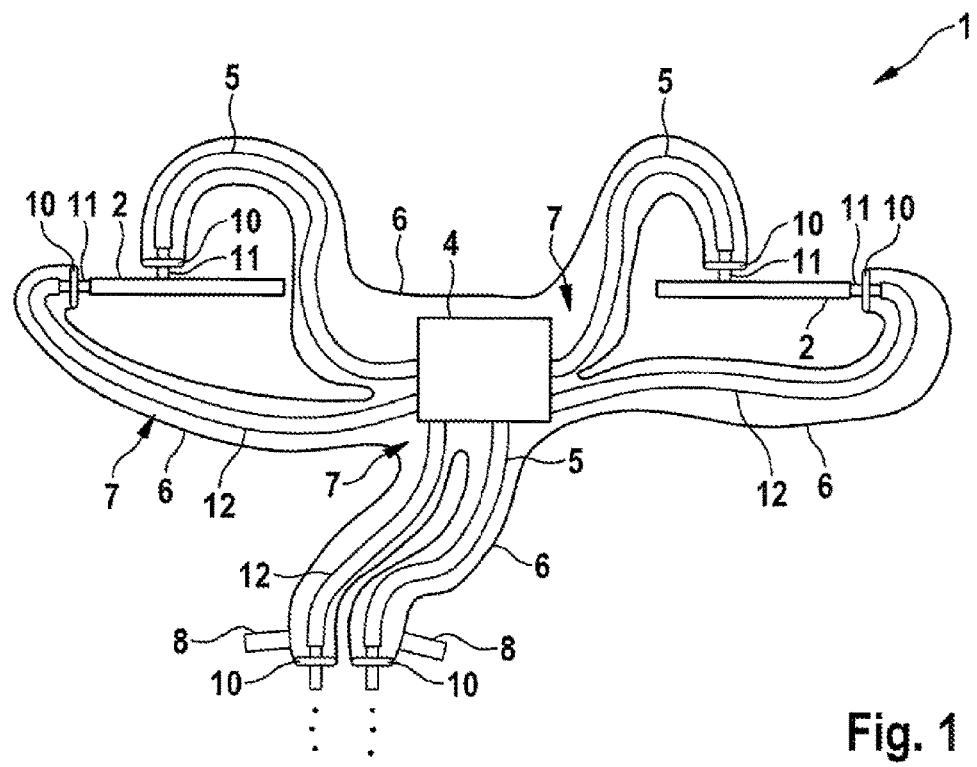
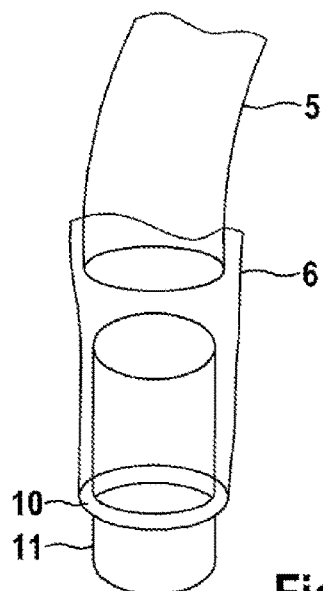
Fig. 1
Fig. 2

COOLING SYSTEM HAVING A COOLANT-CONDUCTING HEAT SINK FOR COOLING A BATTERY

This application claims priority under 35 U.S.C. § 119 to patent application number DE 10 2013 200 790.6, filed on Jan. 18, 2013 in Germany, the disclosure of which is incorporated herein by reference in its entirety.

The disclosure relates to a cooling system having at least one coolant-conducting heat sink for cooling a battery, in particular for cooling a battery configured as an energy source for driving hybrid, plug-in hybrid or electric vehicles, and having further coolant-conducting components comprising at least one conduit for feeding coolant to the at least one heat sink and at least one conduit for carrying coolant away from the at least one heat sink.

BACKGROUND

Batteries, such as lithium-ion batteries in particular, are highly significant as energy storage devices, especially as a rechargeable energy source in hybrid, plug-in hybrid or electric vehicles. Lithium-ion batteries, like other types of battery, are usually constructed from one or more battery modules, a number of battery cells being interconnected to form a battery module. For reliable operation of such batteries and for optimized use of such batteries, especially in respect of performance and service life, it must be ensured that the batteries are operated only in a particular temperature range. Thus, heating of the battery cells beyond a particular temperature must be avoided, especially in the case of high power consumption or high power output, in order, in particular, not to shorten the service life of the battery cells and to avoid "thermal runaway" of the battery cells. Moreover, it may be necessary to heat the battery cells, e.g. if a particular outside temperature is undershot during the use of such batteries in vehicles. For this reason, cooling systems of the type stated at the outset are used to control the temperature of the batteries. In this case, the battery to be cooled or battery cells of the battery are usually arranged on or on top of the at least one coolant-conducting heat sink, allowing thermal energy to be transferred between the heat sink and the battery or battery cells. In general, the heat sinks are made of metals of good thermal conductivity, e.g. aluminum. In the present case, the use of the terms "cooling system" and "coolant" is not limited to the function of cooling a battery or the battery cells of the battery but includes more generally the function of controlling the temperature of a battery, that is to say, in particular, also the supplying of heat in order to bring the battery to a preferred operating temperature in the case of a low ambient temperature.

In controlling the temperature of batteries or battery cells by means of cooling systems mentioned at the outset, there is the problem that leaks may occur in components of the cooling system, such as, in particular, the connecting joints for conduits of the cooling system, or in the conduits themselves. The causes of this can be aging of materials or external loads, such as vibrations or shocks, for example. These leaks lead to an escape of coolant, which can damage the battery and other surrounding electronic components due to corrosion and/or short circuiting. To improve the leak tightness of coolant delivery hoses, printed publication DE 691 31 054 T2 and printed publication DE 11 2006 000 552 T5 disclose the practice of fitting coolant delivery hoses with inner tubes. Printed publication DE 10 2008 062 158 A1 has furthermore disclosed the practice of surrounding a battery with a jacket to provide protection against moisture.

In addition, there is the problem of condensate formation when controlling the temperature of batteries. Condensate forms on the conduits of the cooling system, especially when the surface temperature of the conduits falls below the "dew point". In this case, the condensate, as well as escaping coolant, can damage the battery and other surrounding electronic components owing to corrosion and/or short circuiting.

Given this situation, it is an object of the present disclosure to improve a cooling system of the type stated at the outset in such a way that batteries and peripheral electronic components can be better protected from coolant escaping from the cooling system and/or condensate that has formed on the components of the cooling system.

SUMMARY

To achieve the object, a cooling system is proposed having at least one coolant-conducting heat sink for cooling a battery, in particular for cooling a battery configured as an energy source for driving hybrid, plug-in hybrid or electric vehicles, and having further coolant-conducting components comprising at least one conduit for feeding coolant to the at least one heat sink and at least one conduit for carrying coolant away from the at least one heat sink, wherein at least some of the further coolant-conducting components are at least partially surrounded by at least one sheathing element, such that a closed volume space is formed between the at least one sheathing element and the at least some of the further coolant-conducting components. In addition to the at least one conduit for feeding coolant to the at least one heat sink and the at least one conduit for carrying coolant away from the at least one heat sink, further coolant-conducting components of the cooling system can be, in particular, connecting pieces of conduits, reservoirs, connection stubs or distributing devices. The at least one conduit for feeding coolant to the at least one heat sink and/or the at least one conduit for carrying coolant away from the at least one heat sink can, in particular, each be configured as flexible hoses or as metal pipes or as a combination of flexible hoses and metal pipes. It is advantageous if the at least one sheathing element is of liquid-impermeable configuration, that is to say that no liquid, in particular no liquid coolant and no condensate, can escape from the at least one sheathing element. At the points at which the at least one sheathing element is connected directly to components of the cooling system, suitable sealing means are provided, e.g. sealing rings known in the prior art, which prevent liquid from escaping at these points. It is advantageous if the at least one sheathing element is of flexible configuration and consists at least very largely of at least one thin-walled material, preferably a plastic film. It is advantageous if a plastic film of this kind comprises a plurality of plastic layers, wherein the plastic layers preferably have different material properties, ensuring that the at least one sheathing element is advantageously of flexible, tear-resistant and/or liquid-impermeable configuration. The further coolant-conducting components of the cooling system are preferably surrounded by a single sheathing element, wherein the sheathing element is preferably branched to match the branches of the cooling system, in particular in such a way that the sheathing element is, at least to a rough approximation, spaced apart equidistantly from the sheathed components, advantageously with a spacing of not less than 0.5 cm and not more than 15 cm.

The present disclosure is based on the realization that a cooling system with sheathing according to the disclosure for coolant-conducting components of the cooling system, in particular sheathing of those components which are arranged close to the battery to be cooled or to the battery cells to be cooled and/or to further peripheral electronic components, protects a battery to be temperature-controlled and peripheral electronic components in an effective and low-cost manner from damage due to escaping coolant and/or from condensate that forms on components of the cooling system. This protective function is advantageously improved further by the additional features mentioned below, either individually or in combination.

An advantageous embodiment of the cooling system envisages that the at least one conduit for feeding coolant to the at least one heat sink and/or the at least one conduit for carrying coolant away from the at least one heat sink is surrounded at least in a certain section or sections by the at least one sheathing element. Since these components of the cooling system are usually arranged in the immediate vicinity of the battery, the battery, in particular, is better protected from escaping coolant in the case of leaks and from condensate that forms on the conduits. In particular, provision is made for a segment of a conduit beginning from the connection to the heat sink to be surrounded by a sheathing element.

According to another advantageous embodiment of the disclosure, the at least one sheathing element is of thermally insulating configuration. For this purpose, the sheathing element can be made from a thermally insulating plastic film, for example. In this case, the sheathing element preferably has a heat-reflecting external and/or internal layer. This heat-reflecting layer can be applied to the at least one sheathing element by vapor deposition, for example. A sheathing element of thermally insulating configuration advantageously reduces heating of coolant to be fed to the at least one heat sink and heat liberation from coolant to be carried away from the at least one heat sink in respect of the components surrounded by the sheathing element. In addition, a sheathing element of thermally insulating configuration advantageously reduces condensate formation on the components surrounded by the sheathing element.

According to another advantageous embodiment of the disclosure, the at least one sheathing element has at least one drain opening for draining off liquid within the volume space. According to an advantageous embodiment, the drain opening in each case has a hose-type extension, via which liquid can be drained selectively from the volume space, in particular in such a way that contact between the liquid drained off and the battery and further electronic components is excluded. It is advantageous if the at least one drain opening is configured as a valve which can be opened and closed. In this case, the closed valve prevents an escape of liquid, in particular condensate and/or coolant, from the volume space formed by the sheathing element, ensuring that the liquid collects in the volume space. The collected liquid can be discharged from the volume space by opening the valve.

According to another advantageous embodiment of the disclosure, the at least one sheathing element has a means for detecting moisture within the volume space. The means for detecting moisture is preferably a moisture sensor. In this case, the moisture sensor can advantageously be configured in such a way that an electric contact is closed if moisture precipitates on the sensor. In this case, the closure of the electric contact advantageously indicates the presence of moisture. The at least one means for detecting moisture is preferably configured to indicate that it is necessary to drain liquid out of the volume space and/or that the cooling system has a leak.

Another embodiment of the disclosure envisages that the at least one sheathing element has an internal framework which spaces the sheathing element apart from those of the further coolant-conducting components which are surrounded by the sheathing element. In this case, the internal framework is preferably configured and connected to the sheathing element in such a way that the internal framework as it were creates the volume space by spacing the sheathing element apart from the at least some of the further coolant-conducting components surrounded by the sheathing element. The internal framework preferably has transverse struts arranged radially on the coolant-conducting component, wherein one end of a transverse strut is arranged on the coolant-conducting component and the other end of a transverse strut is arranged on the sheathing element. The internal framework advantageously prevents the sheathing element accidentally adhering to components of the cooling system and thus impairing the action of the sheathing element, in particular the insulating effect thereof.

A preferred embodiment of the disclosure envisages that the at least one sheathing element is of gastight configuration, such that the at least one sheathing element can be filled with gas, wherein the gas-filled at least one sheathing element is spaced apart from the at least some of the further coolant-conducting components. The volume space between the sheathing element and the coolant-conducting components of the cooling system which are surrounded by the sheathing element is as it were created by means of a gas introduced into the at least one sheathing element. The gas for filling the sheathing element is preferably air. The gas advantageously improves the insulating effect of the at least one sheathing element, ensuring a further reduction in heat liberation from components carrying coolant away and in heat absorption by components feeding coolant in. Moreover, the insulating effect advantageously further reduces the formation of condensate. In addition, it is advantageously possible to detect whether there are leaks in the sheath when filling the at least one sheathing element with a gas. According to an advantageous embodiment, the drain opening in the sheathing element is configured in such a way that the sheathing element can be filled with gas via the drain opening. In a variant embodiment, the sheathing element has a filling opening which is configured in such a way that the sheathing element can be filled with a gas via the filling opening, and the filling opening can be closed in a gastight manner after the sheathing element has been filled with gas.

Another advantageous embodiment of the disclosure envisages that the at least one sheathing element is of at least partially transparent configuration, such that the at least some of the further coolant-conducting components which are surrounded by the at least one sheathing element are at least partially visible. An embodiment of this kind advantageously makes it possible to carry out visual inspections, in particular with a view to determining whether conduits are arranged correctly in the region of connecting points of the cooling system and/or whether the cooling system has any leaks in the coolant-conducting components. According to a preferred embodiment, the at least one sheathing element has transparent inspection windows to allow visual inspections, at least in the region of connecting and/or connection points of coolant-conducting conduits.

According to another embodiment of the disclosure, the at least one sheathing element has a closing mechanism which makes it possible to arrange the sheathing element so as to surround the at least some of the further coolant-conducting components. Here, the closing mechanism is preferably configured in the manner of a zip fastener, particularly preferably as a watertight zip fastener, e.g. as a toothless zip fastener. The closing mechanism advantageously facilitates the mounting of the sheathing element around the coolant-conducting components. Moreover, removal, e.g. for repair or to inspect the functioning of the components surrounded by the sheathing element, is advantageously facilitated.

Another advantageous embodiment of the disclosure envisages that the at least one heat sink is arranged in a housing together with a battery to be cooled by the heat sink and with at least some of the further coolant-conducting components, wherein those of the coolant-conducting components which are situated in the housing are surrounded by the at least one sheathing element. In particular, the housing can be a battery housing or the installation space for a battery to be temperature-controlled in a vehicle. The battery and the peripheral electronic components of the battery are advantageously protected in a particularly effective manner from escaping coolant and/or condensate by the housing and the at least one sheathing element. In particular, provision is made for a battery that is to be temperature-controlled to be arranged with the heat sink provided for the battery in a battery housing, wherein a conduit for feeding coolant to the heat sink leads into the housing and a conduit for carrying coolant away from the heat sink leads out of the housing, wherein the conduit for feeding coolant in is completely surrounded by a sheathing element within the housing, and the conduit for carrying coolant away is completely surrounded within the housing by the same sheathing element or by another sheathing element. The battery and peripheral electronic components of the battery are thereby advantageously better protected from escaping coolant in the case of leaks and from condensate that forms on the conduits.

BRIEF DESCRIPTION OF THE DRAWINGS

Further advantageous details, features and embodiment details of the disclosure are explained in greater detail in conjunction with illustrative embodiments shown in the figures, of which:

FIG. 1 shows, in a schematic illustration, an illustrative embodiment of a cooling system according to the disclosure;

FIG. 2 shows, in a schematic illustration, a detail of the illustrative embodiment shown in FIG. 1;

DETAILED DESCRIPTION

Figure 3:
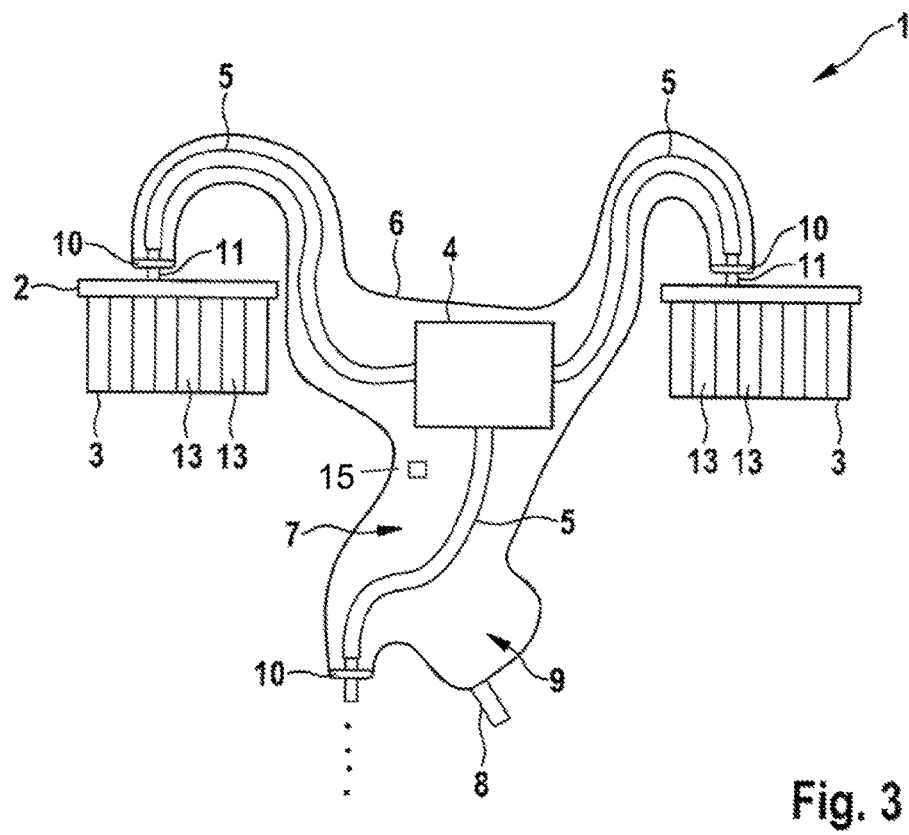
FIG. 3 shows, in a schematic illustration, another illustrative embodiment of a cooling system according to the disclosure.
Figure 4:
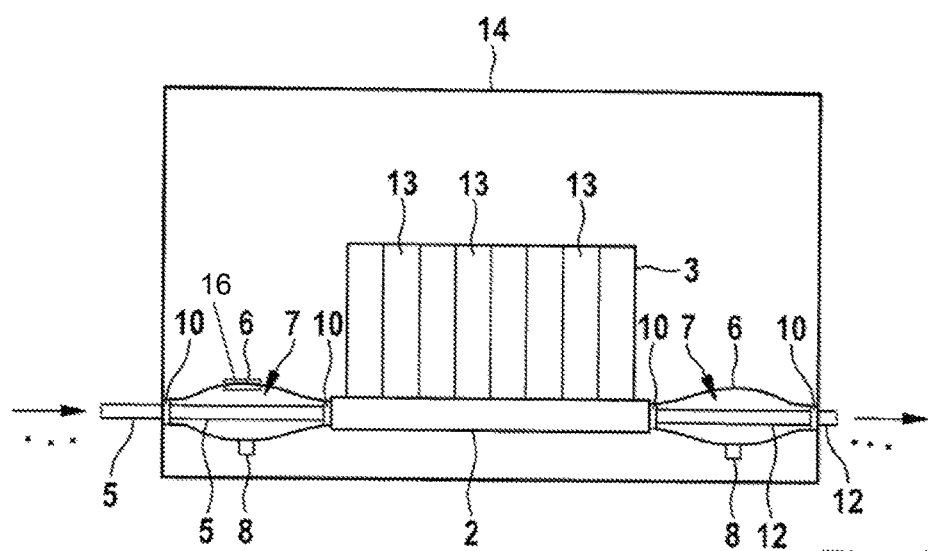
FIG. 4 shows, in a schematic illustration, another illustrative embodiment of a cooling system according to the disclosure.

In the illustrative embodiments shown in FIG. 1, FIG. 3 and FIG. 4, only part of a cooling system is shown in each case, for reasons of greater clarity, said system having components surrounded by a sheathing element. Components that are not shown, such as, in particular, a device for controlling the temperature of the coolant in a coolant circuit, should be embodied in a manner known from the prior art.

The cooling system 1 shown in FIG. 1 has two coolant-conducting heat sinks 2 for cooling a battery (not shown explicitly in FIG. 1). Here, the heat sinks 2 are configured as metal cooling plates, each of which has two connection stubs 11, via which coolant can be fed in and discharged. A water/glycol mixture or the coolant R1234yf can be provided as the coolant, for example. In addition, the cooling system 1 has further coolant-conducting components, in particular conduits 5 for feeding coolant to the heat sinks 2, conduits 12 for carrying coolant away from the heat sinks 2 and, as a further coolant-conducting component, a central coolant distributor 4. Here, the central coolant distributor 4 is fed with coolant via a feed conduit 5. The coolant is then fed to the respective heat sinks 11 by the coolant distributor 4 via further feed conduits 5. The feed conduits 5 leaving the central coolant distributor 4 are connected to the heat sinks 2, in the present case via the connection stubs 11, which are arranged on the heat sinks 2 in FIG. 1. Via the further connection stubs 11, which are arranged laterally on the heat sinks 2 in FIG. 1, the coolant, after flowing through the respective heat sink 2, is carried to the central coolant distributor 4 via the conduits 12 connected to the heat sinks 2 and, from said distributor, is fed back into the coolant circuit via a further conduit 12 leaving the central coolant distributor 4 (the complete coolant circuit is not shown explicitly in FIG. 1 for reasons of greater clarity). The further coolant-conducting components of the cooling system 1 which are shown in FIG. 1, namely conduits 5, conduits 12 and the central coolant distributor 4 are surrounded by a sheathing element 6, such that a closed volume space 7 is formed between the sheathing element 6 and the further coolant-conducting components 5, 12 and 4. In this case, the sheathing element 6 is of liquid-impermeable configuration and, at each end, is arranged in an airtight and liquid-impermeable manner on the conduits 5 and 12 or the connection stubs 11 using a sealing means 10 e.g. a sealing ring. The sheathing element 6 thus prevents coolant from escaping from the sheathing element 6 in the event of a leak in the cooling system 1 in the region of the further coolant-conducting components of the cooling system 1 which are surrounded by the sheathing element 6. The cooling system 1 with the sheathing element 6 thus protects the battery to be cooled and, if appropriate, further peripheral electronic components from damage by coolant. In the present case, the sheathing element 6 is composed of flexible plastics, wherein the internal and external surface of the sheathing element 6 each receive a vapor-deposited heat-reflecting layer (not shown explicitly in FIG. 1). The regions in which the sheathing element 6 is connected to the conduits 5 and 12 and the connection stubs 11 are not included therein. In these regions, the sheathing element 6 is of transparent configuration, such that the cooling system 1 can be checked for leaks in these connecting regions by simple visual inspection, in particular without having to remove the sheathing element 6 for this purpose.

In the cooling system 1 shown in FIG. 1, the sheathing element 6 is filled with air, thereby ensuring that the sheathing element 6 has an improved thermal insulating action, thus reducing heat liberation from components 12 carrying coolant away and heat absorption by components 5 feeding coolant in. In this case, the sheathing element 6 is filled with air via a filling opening, which is not shown explicitly in FIG. 1. The sheathing element 6 furthermore has two drain openings 8 of hose-type configuration for draining off liquid that has collected within the volume space 7. In the present case, each of the drain openings 8 has a closure element (not shown explicitly in FIG. 1), which must be opened to drain off liquid that has collected in the volume space 7. According to a variant embodiment which is not shown, the drain openings 8 are arranged in such a way that liquid can be drained off in a directional manner, wherein the drain openings are routed in such a way by means of hose-type extensions that liquid leaving the volume space 7 via the drain opening cannot damage either the battery or other electronic components.

FIG. 2 shows an enlarged detail of the illustrative embodiment shown in FIG. 1, illustrating a connection stub 11, which is arranged on a heat sink 2 and via which coolant can be fed to a heat sink 2. In this case, the connection stub 11 is of tubular configuration, wherein a feed conduit 5 (or a discharge conduit 12) can be placed over the connection stub 11 to secure it on the heat sink 2, wherein the feed conduit is advantageously of flexible configuration and can be connected nonpositively to the connection stub 11. The sheathing element 6 (likewise shown only partially in FIG. 2) is likewise arranged in an airtight and liquid-impermeable manner on the connection stub 11 by means of a sealing ring 10, preferably in such a way that the end of the feed conduit 5 is surrounded by the sheathing element 6.

FIG. 3 shows another illustrative embodiment of a cooling system 1 according to the disclosure. This has two coolant-conducting heat sinks 2 for cooling a battery 3. In the present case, the battery 3 is configured as an energy source for driving electric vehicles and has a multiplicity of interconnected battery cells 13. The cooling system 1 furthermore comprises conduits 5 for feeding coolant to the heat sinks 11, conduits for carrying coolant away from the heat sinks 2 (for reasons of greater clarity, the conduits for carrying the coolant away from the coolant-conducting heat sinks 2 are not shown explicitly in FIG. 3) and a central collector 4, from which coolant fed in is passed on to the respective heat sinks 2 and to which coolant to be discharged is initially fed from the heat sinks 2 in order then to be discharged centrally from the central collector 4. The conduits 5 for feeding in and carrying away coolant and the central collector 4 are surrounded by a liquid-impermeable sheathing element 6, more specifically in such a way that a closed volume space 7 is formed between the sheathing element 6 and the components 4, 5 surrounded by the sheathing element 6. In this case, the sheathing element 6 is configured in such a way that the sheathing element 6 forms a volume space region 9 for trapping and collecting liquid, in particular condensate that has formed on the conduits and/or coolant that has escaped owing to leaks. In this case, the sheathing element 6 has a moisture sensor 15 in volume space region 9, said sensor being configured to detect moisture in volume space region 9 and to send a detection signal to a control unit (not shown explicitly in FIG. 3). This control unit can then emit a signal which indicates that there is liquid in the volume space 7. Via a valve 8, the liquid can then be removed from the volume space 7. Via the valve 8, the sheathing element 6 can furthermore be filled with gas, in particular with air, the sheathing element 6 being spaced apart from the surrounding coolant-conducting components 4, 5 by the gas.

FIG. 4 shows another illustrative embodiment of a cooling system 1 according to the disclosure. In this case, a heat sink 2 is arranged in a battery housing 14 together with a battery 3 to be cooled by the heat sink, said battery having a plurality of interconnected battery cells 13, and with a conduit 5 for feeding a coolant to the heat sink 2 and a conduit 12 for carrying a coolant away from the heat sink 2 as some of the further coolant-conducting components. Those of the further coolant-conducting components which are situated in the battery housing 14, namely conduit 5 and conduit 12, are each surrounded by a sheathing element 6. At the same time, the sheathing elements 6 are each expanded by an internal framework (not shown explicitly in FIG. 4), wherein the internal framework spaces the sheathing elements 6 apart from conduit 5 and conduit 12 respectively, e.g. by means of transverse struts arranged radially on conduit 5 and conduit 12. The ends of the sheathing elements 6 are each arranged on the conduits 5 and 12, respectively, by means of sealing elements 10. However, arrangement on corresponding connection stubs (not shown explicitly in FIG. 4), in particular, is also envisaged, as explained in conjunction with FIG. 2 for example. The sheathing elements 6 may each have a toothless watertight zip fastener 16 as a closing mechanism. Here, the zip fasteners may be configured to enable the respective sheathing elements 6 to be opened and closed in the direction of the longitudinal extent thereof, it being possible for the sheathing elements 6 to be arranged around conduits 5 and 12 in the opened state, and for the volume space 7 between the sheathing elements 6 and conduits 5 and 12 surrounded by the sheathing elements 6 to be formed by closing the zip fasteners and fixing the ends of the respective sheathing elements 6 by means of the sealing elements 10. The sheathing elements 6 each have a valve 8, which can be opened in order to drain the liquid in the volume space 7 out of the volume space 7. In this case, the valves 8 each have a moisture sensor on the side facing the volume space 7 in order to detect liquid which has formed and, when liquid has collected in the volume space 7, to transmit a detection signal to a control unit (not shown explicitly in FIG. 4), wherein the control unit advantageously generates a warning or indicator signal, thus enabling service personnel to check the coolant-conducting components 5, 12 surrounded by the sheathing elements 6 and, if appropriate, to drain liquid out of the volume spaces 7 via the valves 8.

The illustrative embodiments shown in the figures and explained in conjunction therewith serve for explanation and do not restrict said explanation.

What is claimed is:

1. A cooling system, comprising:
   at least one coolant-conducting heat sink configured to cool a battery; and
   further coolant-conducting components, including:
      at least one feed conduit configured to feed coolant to the at least one heat sink; and
      at least one carry conduit, separate from said feed conduit, configured to carry coolant away from the at least one heat sink,
      wherein the further coolant-conducting components are at least partially surrounded by a sheathing element, such that a closed volume space is formed between the sheathing element and the further coolant-conducting components, and
      wherein the sheathing element is a plastic film, and
      wherein the sheathing element has a closing mechanism configured to be opened and closed in a fluid-tight manner to enable arrangement of the sheathing element to surround the further coolant-conducting components.

2. The cooling system according to claim 1, wherein the sheathing element has a thermally insulating configuration.

3. The cooling system according to claim 1, wherein the sheathing element has at least one drain opening configured to drain off liquid within the volume space.

4. The cooling system according to claim 1, wherein the sheathing element has a mechanism configured to detect moisture within the volume space.

5. The cooling system according to claim 1, wherein the sheathing element has a gastight configuration, such that the sheathing element is configured to be filled with gas, wherein the gas-filled sheathing element is spaced apart from the further coolant-conducting components.

6. The cooling system according to claim 1, wherein the sheathing element has an at least partially transparent configuration, such that the further coolant-conducting components which are surrounded by the sheathing element are at least partially visible.

7. The cooling system according to claim 1, wherein the at least one heat sink is configured to cool the battery configured as an energy source to drive one of a hybrid vehicle, a plug-in vehicle, and an electric vehicle.

* * * * *